United States Patent [19]

Miyakawa et al.

[11] Patent Number: 5,034,132

[45] Date of Patent: Jul. 23, 1991

[54] METHOD FOR EXTRACTION

[75] Inventors: Hisashi Miyakawa, Mobara; Naoki Mizutani, Chiba; Kazuoki Urabe, Yachiyo; Kageo Yoshida, deceased, late of Tokyo, by Sumiko Yashida, legal representative; Osamu Nittani, Tokyo; Koji Hirano, Tokyo, all of Japan

[73] Assignees: Toyo Engineering Corporation, Chiba; Asahi Denka Kogyo Kabushiki Kaisha, Tokyo, both of Japan

[21] Appl. No.: 372,430

[22] Filed: Jun. 23, 1989

[30] Foreign Application Priority Data

Jul. 1, 1988 [JP] Japan .................. 63-164203

[51] Int. Cl.$^5$ .................................. B01D 11/00
[52] U.S. Cl. ................... 210/634; 422/140; 210/661
[58] Field of Search .............. 210/661, 634; 422/140, 422/142, 144; 208/427, 428

[56] References Cited

U.S. PATENT DOCUMENTS

| | | | |
|---|---|---|---|
| 3,970,541 | 7/1976 | Williams et al. | 208/428 |
| 4,306,058 | 12/1981 | Copelin | 528/498 |
| 4,589,927 | 5/1986 | Allen et al. | 422/140 X |

OTHER PUBLICATIONS

Publication Chem. Ing. Tech. 56 (1984), No. 11, pp. 856-857.
"Supercritical Fluid Extraction", Principles and Practice, by McHugh and Krukonis, Butterworths Publishers (Boston) (1986), pp. 143-180.

Primary Examiner—Frank Spear
Attorney, Agent, or Firm—Flynn, Thiel, Boutell & Tanis

[57] ABSTRACT

There is disclosed a method for extraction of impurities from a powdery or particulate solid material charged into a extractor. According to the disclosure, not only can the extraction of impurities be carried out efficiently, but also the refinement of a solid material can be carried out, with the degree of the extraction of the impurities being very high.

12 Claims, 2 Drawing Sheets

METHOD FOR EXTRACTION

FIELD OF THE INVENTION

The present invention relates to a method for removing impurities or the like contained in polymers, rubbers, etc. in the form of powder, pellets, or the like.

BACKGROUND OF THE INVENTION

Conventionally, use has been made of, as a method for removing impurities (e.g., solvents, monomers, oligomers, and by-products) remaining in a polymer or a rubber, such means as evaporation by heating and vacuum evaporation. However, small amounts of impurities still remain, and some of these impurities deteriorate the quality of the product, or are harmful to the human body. If the polymer or the like is heated in order to reduce its impurity content, the polymer will be, for example, changed in quality or softened, so that it is impossible to lower the remaining amounts of impurities to below a certain degree.

Therefore, recently, high-pressure extraction processes using for example supercritical fluids have been suggested (e.g., *Chem. Ing. Tech.* 56 (1984) Nr. 11, S. 856). Japanese Patent Application (OPI) No. 115419/1982 discloses a process wherein cyclic oligomers in a polymer are removed by the use of supercritical fluids.

However, according to the supercritical fluid extraction described in Japanese Patent Application (OPI) No. 115419/1982, cyclic oligomers still remain to a certain degree in the polymer. When impurities are removed by extraction from a polymer by using a high-pressure extraction process, if the polymer is, for example, in the form of a powder or pellets having a small particle size, the volume of the polymer increases due to the absorption of the extractant when the polymer is subjected to the extraction, which sometimes causes the solid particles to stick to each other. Further, in some cases, a change such as a softening or melting of the polymer in the form of powder, pellets, or the like, which is caused under extraction conditions, causes the particles or pellets of the polymer to stick to each other. That is, in conventional high-pressure extraction processes, when a polymer is subjected to extraction, the particles or the pellets of the polymer stick to each other during the progress of the extraction process to form a mass of the polymer. This raises a qualitative problem with the polymer product, is unfavorable when the product is to be removed from the extractor, and raises the necessity of step, such as grinding of the product.

On the other hand, when the temperature is lowered, the extraction speed becomes low, and the extraction requires a longer period of time, which is economically disadvantageous because the apparatus must be made large and the amount of the extractant must be increased.

In particular, when the solid material (e.g., a polymer) to be treated is a powder of small particle size, sticking and the formation of a mass is more liable to take place, and extraction to a high degree is impossible.

BRIEF SUMMARY OF THE INVENTION

Therefore, the first object of the present invention is to provide a method for removing impurities remaining, for example, in a polymer or a rubber by extraction without causing sticking and the formation of a mass of the powdery or particulate solid material.

A second object of the present invention is to provide a method for refining a solid material wherein impurities remaining therein, for example, in the polymer or the rubber can be extracted efficiently, and the degree of extraction of the impurities is very high.

The above and other objects, features, and advantages of the invention will become apparent in the following detailed description and drawings.

DETAILED DESCRIPTION OF THE INVENTION

The inventors have conducted research intensively to overcome the above prior problems involved in the removal of impurities in solid products and have found that by subjecting a powdery product to a prescribed fluidized state under specific conditions, and bringing the powdery product in contact with an extractant in the supercritical state or in liquid form, the particles of the solid material can be prevented from sticking to each other to form a mass and the removal of impurities can be carried out efficiently, which lead to the present invention.

That is, the present invention provides an extraction method wherein when an extractor is charged with a powdery or particulate solid material, and impurities contained in the solid material are extracted with an extractant rising in the extractor, the rising speed of the extractant is to be equal to or over the minimum fluidizing velocity of the solid material charged in the extractor but equal to or lower than the terminal velocity of the solid material.

The present invention will be described with reference to an embodiment of the present invention.

Figure 1:
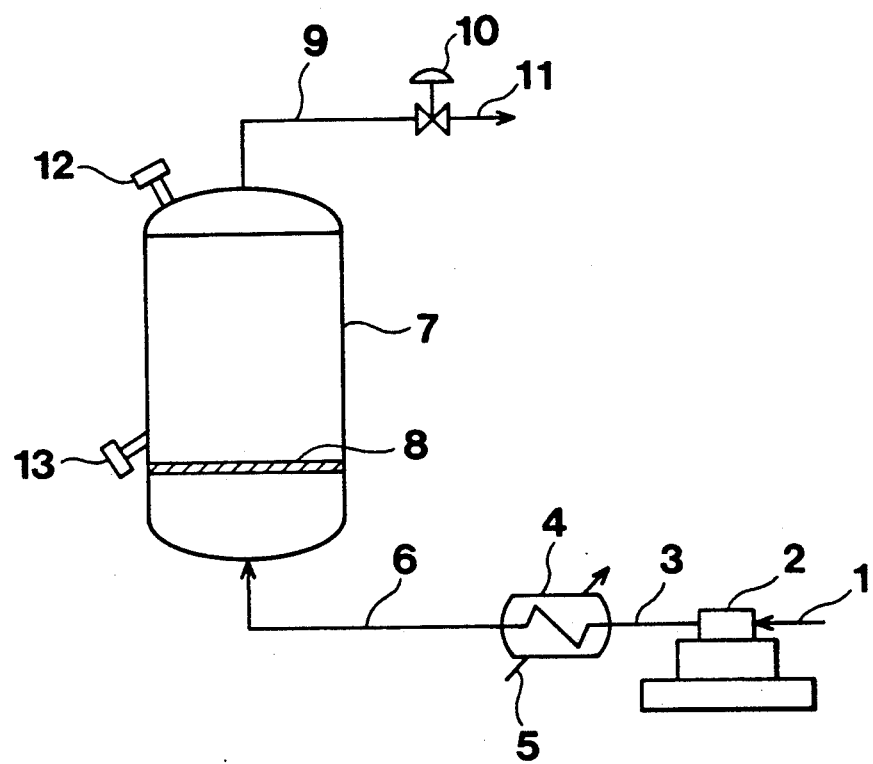
FIG. 1 shows a flow sheet that includes the extracting apparatus used in carrying out the present method.

FIG. 1 is a flow sheet showing an embodiment of the present invention. In FIG. 1, an extractant is fed from a storage tank (not shown), such as an extractant tank or bomb, through a line 1 into a pressure booster 2 for the extractant, where the pressure of the extractant is increased to a pressure suitable for the extraction. The pressure booster is a compressor when the extractant is a gas, or a pump when the extractant is a liquid. The pressure booster may comprise plural boosters that may be arranged in series or in parallel. The extractant, whose pressure suitable has been boosted to a pressure for extraction, is fed through a line 3 into a heat exchanger 4, where the temperature of the extractant is controlled at a temperature for extraction by a fluid from a line 5, and is fed through a line 6 to an extractor 7. A dispersing apparatus 8 for the extractant located in a lower section of the extractor 7 comprises, for example, a sintered metal plate. A prescribed amount of a powdery or particulate solid material that contains impurities, such as a polymer or rubber, which is to be subjected to extraction, is charged into an upper section of the extractor 7 over the dispersing apparatus 8 from an inlet 12. Although the amount of the extractant to be charged into the extractor 7 is also related to the charging rate of the extractant and the height of the settling zone of the small-particle size powder at the upper section, generally the amount of the extractant to be charged is on the order of 20 to 90% of the height of the section over the extractant dispersing apparatus, excluding the settling zone, but it is not particularly restricted thereto.

The extractant that has extracted impurities is passed from a line 9 into a pressure controlling valve 10 and is discharged or recovered through a line 11. If the extractant is to be recovered and reused, the impurities contained in the extractant are separated and removed by the usual means of applying a pressure reduction and/or elevating the temperature of the extractant or, for example, by means of adsorption separation.

The rising speed of the extractant is in the range equal to or over the minimum fluidizing velocity of the powdery or particulate solid material charged into the extractor, but equal to or lower than the terminal velocity of the solid material, and the rising speed of the extractant is set by measuring the flow rate by a flow meter or flow meters (not shown) provided on lines 1, 3, 6, 9, and 11 so that an appropriate fluidized state, as stated above, may be maintained.

The treated solid material that has been subjected to the extraction treatment is discharged from an outlet 13.

In the present invention, the term "minimum fluidizing velocity" means the superficial velocity in the column at the time when the solid material layer begins to move from the static state along with the extractant when the extractant is flowed upward through the loaded layer of the powdery or particulate solid material and the flow speed is increased gradually, and minimum fluidizing velocity is also referred to as the fluidization start velocity. The term "terminal velocity" means the velocity at which the solid material that has started to settle in the extractant due to the action of gravity reaches a state where the solid material settles at a constant speed.

In the present invention, if the speed of flow of the extractant is upward through the extractor is smaller than the minimum fluidizing velocity, the powdery or particulate solid material in the extractor is not fluidized, so that sticking, forming of a mass, or the like would occur. If the speed of flow of the extractant is over the terminal velocity, the solid material in the extractor is brought upward by the extractant, causing sticking, and also resulting in the formation of a mass.

In the present invention, although the minimum fluidizing velocity and the terminal velocity may vary depending on the particle diameter, the density and the load of the solid material to be subjected to extractor treatment, the type of the extractant, and various conditions such as the extraction pressure and the temperature, they can be determined experimentally.

As an example, a chlorinated polyethylene (with a density of 1.6 g/cm$^3$) in the form of a powder (of a particle size 100 μm) was subjected to extraction using carbon dioxide, and the terminal velocity ($u_t$[m/s]) and the minimum fluidizing velocity ($u_f$[m/s]) were calculated as functions of the extraction pressure, the results of which are shown in the following table. The extraction is carried out such that the flow speed of the extractant in the extractor is controlled to be between the values of $u_t$ and $u_f$ shown in the following table.

TABLE 1

The terminal velocity($u_t$) and the minimum fluidizing velocity($u_f$) related to the extraction pressure

| Pressure P(kg/cm$^2$G) | Density of Extractant ρf(kg/m$^3$) | Viscosity of Extractant μ(kg/m s) | Terminal Velocity $u_t$(m/s) | Minimum Fluidizing Velocity $u_f$(m/s) |
|---|---|---|---|---|
| 0 | 1.77 | 1.506 × 10$^{-5}$ | 0.547 | 0.0244 |
| 5 | 11.37 | 1.528 × 10$^{-5}$ | 0.292 | 0.0240 |
| 10 | 20.97 | 1.549 × 10$^{-5}$ | 0.236 | 0.0237 |
| 15 | 30.57 | 1.571 × 10$^{-5}$ | 0.206 | 0.0233 |
| 20 | 40.17 | 1.593 × 10$^{-5}$ | 0.187 | 0.0225 |
| 30 | 65.42 | 1.656 × 10$^{-5}$ | 0.155 | 0.0213 |
| 50 | 130.5 | 1.84 × 10$^{-5}$ | 0.115 | 0.0183 |
| 60 | 169.9 | 1.957 × 10$^{-5}$ | 0.102 | 0.0168 |
| 65 | 202.3 | 2.109 × 10$^{-5}$ | 0.0921 | 0.0152 |
| 70 | 267.2 | 2.17 × 10$^{-5}$ | 0.0806 | 0.0141 |
| 75 | 666.9 | 3.65 × 10$^{-5}$ | 0.0394 | 0.00587 |
| 80 | 705.3 | 5.26 × 10$^{-5}$ | 0.0333 | 0.00391 |
| 90 | 740.6 | 5.828 × 10$^{-5}$ | 0.0308 | 0.00339 |
| 100 | 775.9 | 6.396 × 10$^{-5}$ | 0.0286 | 0.00296 |

Note: Temperature = 30° C.
Shape factor (φs) = 0.5
Void (εf) immediately before the start of fluidization = 0.75

In the present invention, there is no particular limitation on the particle diameter, the shape, or the like of the powdery or particulate solid material to be subjected to the extraction treatment, as long as the powdery or particulate solid material can be dissolved or swelled by the extractant and the particulate solid material includes pellets.

In the present invention, the smaller the particle diameter the solid material is, the faster the diffusion of the extractant into the solid material, thereby increasing the extraction effect and increasing the extraction rate. Therefore, it is preferable that the solid material is in the form of a powder. Such a powder includes one powdery from the beginning and one obtained by grinding a solid material. Although in the prior art such a powder easily formed a mass when extraction was carried out, in the present invention forming of such a mass is prevented and the extraction effect and the extraction rate can be increased.

Such a solid material preferably includes polymers and rubbers, such as polyethylene, polypropylene, polystyrene, polyvinyl chloride, polyoxymethylene, and polyacrylamide, and their copolymers, as well as chlorinated products, rubbers, and chlorinated rubbers. Impurities to be extracted include monomers, oligomers, etc. remaining in such polymers, for example, remaining formaldehyde, styrene, trioxymethylene, water and organic solvents.

The solid material suitable for the extraction treatment of the present method is a polymer having appropriate swellability in the particular extractant, and an extractant that can appropriately dissolve or swell such a solid material is used to carry out the extraction treatment of such a solid material.

The extractant used in the present invention is suitably selected for the particular solid material to be subjected to extraction treatment, and as specific examples of the extractant can be mentioned (a) carbon dioxide, nitrous oxide, carbon disulfide, a hydrocarbon (e.g., ethane, ethylene, propane, and propylene), and a halogenated hydrocarbon (e.g., fluorocarbons), (b) a mixture of two or more of the above gases, and (c) a mixture made up of the above material and a second extractant for impurities (e.g., usual organic solvents, such as methanol and ethanol).

The extractant used in the present invention a liquid or in the supercritical state, although it is preferable that the extractant is used in the supercritical state. In this case, although the pressure and the temperature of the extractor may vary depending on the particular solid material, generally it is preferable that the pressure is 40 to 500 kg/cm$^2$G and the temperature is 0° to 150° C. If the pressure is below 40 kg/cm$^2$G, the extraction capacity of the extractant is low and an adequate extraction effect cannot be obtained, and, on the other hand, if the pressure is over 500 kg/cm$^2$G, the extraction is not economical in terms of the increased cost of the apparatus that must be designed to be pressure resistant and the power required to compress the extractant. Further, if the temperature is below 0° C., the extraction rate lowers, and, on the other hand, if the temperature is over 150° C., softening, adhesion, forming of a mass, or deterioration of the material (solid material) to be subjected to extraction will take place.

Figure 2:
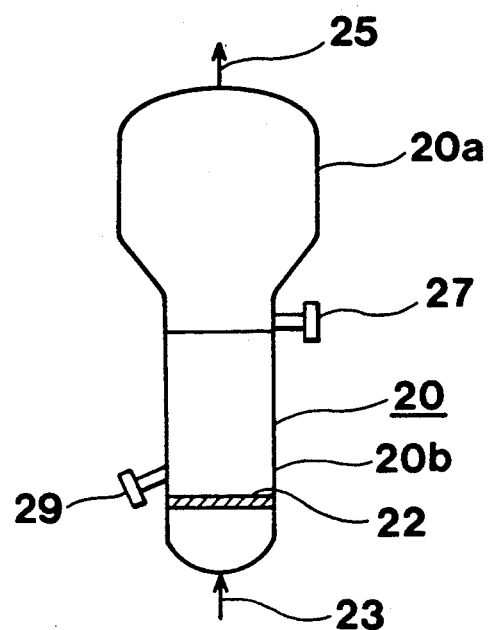
FIGS. 2 and 3 are cross-sectional views of other examples of the extractor used in carrying out the present method.
Figure 3:
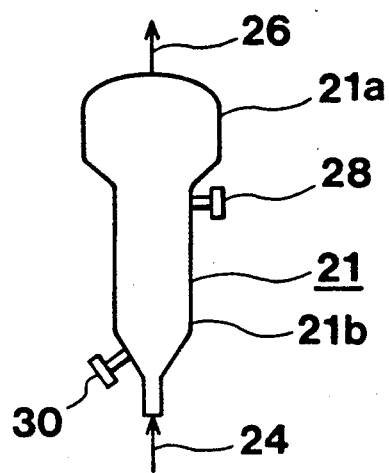

Although there is no particular limitation on the type of the extractor used in the present invention, a fluidized bed-type extractor or a spouted bed-type extractor is preferably used. FIG. 2 shows a fluidized bed-type extractor 20 in cross section, and FIG. 3 shows a spouted bed-type extractor 21 in cross section. More particularly, reference numerals 20a and 21a indicate settling zones of small-particle size powder at the upper sections, reference numerals 20b and 21b indicate extracting zones of larger-particle size powder, reference numeral 22 indicates an extractant dispersing plate, reference numerals 23 and 24 indicate extractants to be introduced, and reference numerals 25 and 26 indicate extractants that have extracted impurities and are to be removed. Reference numerals 27 and 28 indicate inlets for the solid material to be treated, and reference numerals 29 and 30 indicate outlets for the treated solid material that has been subjected to extraction treatment.

Though not shown in FIGS. 1 to 3, the feed of the extractant may be divided and supplied through a plurality of points into the extractor.

Further, in the present invention, plural extractors, each of which may be the same as the extractor shown in FIG. 1, may be arranged in parallel, and each is provided with a changeover mechanism of a line through which the extractant is flowed so that the line of the extractor wherein the extraction has been completed may be shut, and the flow of the extractant may be successively changed into another extractor to carry out the extraction continuously. Further, plural extractors may be arranged in series, and the extractant that has been used in the first extractor, which contains impurities, is discharged from the upper section of the first extractor and may be used in the next extractor to extract impurities so that the extraction may be carried out continuously.

In the present method, in some cases, in compliance with the type of the solid material, the following processes are preferably used to prevent the solid material from sticking and forming a mass during the period wherein the pressure is elevating being elevated to the extraction pressure after the charging of the solid material.

For example, if the extraction pressure is 100 kg/cm$^2$G, the pressure in the extractor is increased while the feed rate of the extractant is controlled to create such conditions that, in the course of the increase in the pressure from 0 kg/cm$^2$G, to 100 kg/cm$^2$G the solid material in the extractor may be fluidized at any pressure or under or over a certain pressure.

In another case, for example, if the pressure controlling valve 10 shown in FIG. 1 is shut, since the the rising speed of the extractant in the upper section of the extractor is from low to 0, the pressure in the extractor is increased while the extractant flow is decreased a little by opening the valve at the outlet to some degree.

According to the present invention, a powdery or particulate solid material (e.g., polymers and rubbers) can be subjected to extraction treatment without causing the solid material to stick to form a mass. Further, according to the present invention, not only can the extraction of impurities be carried out efficiently, but also refinement of a solid material can be carried out, with the degree of the extraction of impurities being very high.

Now the present invention will be further described in detail with reference to Examples and Comparative Examples.

EXAMPLE 1

A chlorinated polyethylene (remaining solvent content: 7.5%; remaining solvent: carbon tetrachloride) was subjected to extraction based on the flow sheet shown in FIG. 1. A flow meter for measuring the feed of the extractant was provided on line 1. 40 g of chlorinated polyethylene in the form of a powder (of average particle diameter 20 μm) was charged into the extractor 7, and carbon dioxide as an extractant was fed from the lower section at a rate of 80 g/min. The pressure in extractor was increased gradually by extractor pressure controlling valve 10, and the pressure was increased while the carbon dioxide was fed thereto with the pressure controlling valve 10 opened a little. Finally, after, a pressure of 100 kg/cm$^2$G and a temperature of about 20° C. were maintained for 90 min., the supply of the carbon dioxide was stopped. After the pressure in the extractor became equal to atmospheric pressure, the chlorinated polyethylene was removed and analyzed. Formation of a mass was not observed in the powder, and the content of the solvent in the powder was reduced to 0.6%.

COMPARATIVE EXAMPLE 1

Example 1 was repeated based on the flow sheet shown in FIG. 1, except that the feed of the extractant was reduced to about 1/10 that of Example 1, and the retention time was 4 hours. After the extraction, 80% of the powder formed masses, and the remaining powder formed hard pieces.

COMPARATIVE EXAMPLE 2

An inner cylinder was placed in the extractor shown in FIG. 1, to reduce the cross-sectional area thereof to about 1/20. 8 g of a powdery chlorinated polyethylene were charged into the extractor, and after the pressure was increased with the extractant, the extractant was fed at a rate of ½ that of Example 1 for 10 min. As a result, about half of the chlorinated polyethylene in the extractor stuck to the upper section of the extractor. The stuck polyethylene was a hard mass. Although the chlorinated polyethylene located at the lower section of the extractor was powdery, it contained some masses.

EXAMPLE 2

A powdery chlorinated polypropylene (average particle diameter 20 μm and a remaining solvent content of 5.5%) was subjected to extraction using carbon dioxide as an extractant based on the flow sheet shown in FIG. 1. 40 g of the powdery raw material was loaded into the extractor 7, then, while the pressure and the temperature were kept at 100 kg/cm$^2$G and 20° C. respectively, carbon dioxide was fed at 80 g/min. for 1 hour, and then the feeding was stopped. After the extraction, masses were not observed, and the remaining solvent content was 0.8%.

Having described our invention as related to the preferred embodiment, it is our intention that the invention be not limited by any of the details of the description, unless otherwise specified, but rather be construed broadly within its spirit and scope as set out in the accompanying claims.

What we claim is:

1. A method of removing an impurity from particles of a polymer or rubber containing that impurity which comprises the steps of: charging an extractor with a bed of solid particles of a polymer or rubber containing an impurity, said particles being apt to stick together or agglomerate; flowing an extractant upwardly through said bed at a flow velocity which is equal to or higher than the minimum fluidizing velocity of said particles and which is equal to or lower than the terminal velocity of said particles whereby to convert said bed into an expanded, suspended mass, said extractant being effective to selectively dissolve and remove said impurity from said particles, said extractant being selected from the group consisting of carbon dioxide, nitrous oxide, carbon disulfide, hydrocarbons, halogenated hydrocarbons, mixtures of two or more of the foregoing extractants and a mixture of one or more of the foregoing extractants with a second different extractant for said impurity; and separately recovering (1) said particles having a reduced content of said impurity, and (2) said extractant which is enriched with said impurity.

2. The method as claimed in claim 1, wherein said polymer or rubber is selected from the group consisting of polyethylene, polypropylene, polystyrene, polyvinyl chloride, polyoxymethylene, polyacrylamide, copolymers thereof and chlorinated products thereof, rubbers, and chlorinated rubbers.

3. A method for removing an impurity from particles of a polymer or rubber containing that impurity which consists essentially of the steps of: charging an extractor with a bed consisting essentially of solid particles of a synthetic resin polymer or rubber containing an impurity selected from the group consisting of organic solvents, monomers and oligomers, said polymer being selected from the group consisting of polyethylene, polypropylene, polystyrene, polyvinyl chloride, polyoxymethylene, polyacrylamide, copolymers thereof, chlorinated products thereof, rubbers and chlorinated rubber, said particles being apt to stick together or agglomerate; flowing an extractant upwardly through said bed at a flow velocity which is equal to or higher than the minimum fluidizing velocity of said particles and which is equal to or lower than the terminal velocity of said particles whereby to convert said bed into an expanded, suspended mass, the temperature in the extractor being in the range of 0° to 150° C. and the pressure in the extractor being from 40 to 500 kg/cm$^2$G, said extractant being effective to swell said particles and to selectively dissolve and remove said impurities from said particles, said extractant being in a liquid or supercritical state and being selected from the group consisting of carbon dioxide, nitrous oxide, carbon disulfide, hydrocarbons, halogenated hydrocarbons, mixtures of two or more of the foregoing extractants and a mixture of one or more of the foregoing extractants with a second different extractant for said impurity; and recovering said particles having a reduced content of said impurity from the lower portion of said mass and separately recovering said extractant which is enriched with said impurity from above said mass.

4. An extraction method as claimed in claim 3 in which said hydrocarbon is ethane, ethylene, propane or propylene.

5. The method as claimed in claim 4, wherein said impurity is a monomer, an oligomer, or an organic solvent.

6. The method as claimed in claim 4, wherein the extractant is used in liquid state.

7. The method as claimed in claim 4, wherein the extractant is used in the supercritical state.

8. The method as claimed in claim 4, wherein the pressure in the extractor is in the range of 40 to 500 kg/cm$^2$G.

9. The method as claimed in claim 4, wherein the temperature in the extractor is in the range of from 0° to 150° C.

10. The method as claimed in claim 4, wherein as the extractor, a fluidized bed extractor is used.

11. The method as claimed in claim 4, wherein as the extractor, a spouted bed extractor is used.

12. The method as claimed in claim 4, wherein as the extractor, plural extractors are arranged in parallel.

* * * * *